July 24, 1956 J. A. DOREMUS 2,756,414

COUPLING UNIT

Filed March 1, 1952 2 Sheets-Sheet 1

INVENTOR.
John A. Doremus
BY
Forman L. Mueller
Atty.

July 24, 1956 J. A. DOREMUS 2,756,414

COUPLING UNIT

Filed March 1, 1952 2 Sheets-Sheet 2

INVENTOR.
John A. Doremus
BY Foorman L. Mueller
Atty

United States Patent Office 2,756,414

Patented July 24, 1956

2,756,414

COUPLING UNIT

John A. Doremus, Chicago, Ill., assignor to Motorola, Inc., Chicago, Ill., a corporation of Illinois Application March 1, 1952, Serial No. 274,480

10 Claims. (Cl. 340—310)

The present invention relates to carrier current communications systems for use with high voltage alternating current power transmission lines and more particularly to coupling means for connecting such communication systems to the power transmission lines.

High voltage alternating current transmission lines primarily used for transmitting power, have also been used as the carrier medium for communication systems. Such communications systems include transmitters and receivers tuned to frequencies of operation substantially higher than the alternating current power frequency. Coupling filter networks of the high pass type have been used to connect the communication transmitter and receiver to the power transmission lines. Such networks may include a capacitor stack having a plurality of series connected capacitors and a variable inductance connected in series between the transmission line and ground. In such arrangement the plurality of series connected capacitors constitutes a capacitive voltage divider between the transmission line and ground.

One of the important applications of carrier current communication systems of the type referred to is to enable information from a remote point, such as an indication of the electrical condition of the line, to be transmitted on the line to a control station. In some instances the communication equipment for reporting the condition of the line is so remotely located that normal sources of power for energizing the equipment is either unavailable or impractical.

It is an object of the present invention to provide an improved coupling network for connecting a carrier current communication system to a high voltage alternating current transmission line in a manner to enable a metering of the electrical condition of the line.

Another object of the invention is to provide a coupling filter network for connecting a carrier current communication system to a high voltage alternating current transmission line, the network being adapted to connect a proportional amount of the transmission line voltage to a meter in exact phase with the phase of the transmission line voltage for accurate indication by the meter of the instantaneous electrical condition of the line.

Yet another object of the invention is to provide a coupling network for connecting a communication system and a line condition indicating meter to a high voltage transmission line and for powering the communication system from the line, the network being arranged to compensate for the meter and power supply burden on the line and to correct for the meter power factor to thus obtain accurate meter indications of the line conditions at all times.

A feature of the invention is the provision of a high pass coupling network for connecting a communication system to a power transmission line, the network including a capacitor stack comprising a plurality of series connected capacitors forming a capacitive voltage divider between the transmission line and ground, and including a tap connection between two of the series connected capacitors to provide a voltage proportional to the high voltage of the line for indicating the electrical condition of the line.

Another feature of the invention is the provision of a coupling filter network for a high voltage power line, carrier current communications system including means to power the communication system from the high voltage power line and having means to correct the phase of the voltage at the meter to be exactly in phase with the phase of the line voltage and to compensate for the power factor of the meter, and the burden of the meter and power supply on the line. The communication system may be used to transmit information as to the condition of the power line.

Further objects, features and the attending advantages of the invention will be apparent with reference to the following specification and drawings in which.

According to the invention, the signal channels of a carrier communication system are connected to a high voltage alternating current power transmission line through a high pass filter coupling including a capacitor stack and an adjustable inductance connected in series between the transmission line and ground. The capacitor stack comprises a plurality of series connected capacitors enclosed in an insulating housing and forming a capacitive voltage divider from the transmission line to ground. The capacitor stack is provided with a tap connection between two of the series connected capacitors to provide a source of power proportionately lower in voltage than the transmission line voltage. The primary winding of a transformer is connected to the voltage tap and ground in series with a phase correcting reactor to adjust the phase of the voltage induced in the transformer to be exactly in phase with the phase of the line voltage. The secondary winding of the transformer is connected in a low voltage circuit to an indicating meter and may also provide power for energizing the communications system. The low voltage circuit connections may include a variable transformer which may be adjusted to provide a desired proportional amount of voltage for operating the meter and power supply as determined by the burden of the meter and power supply on the transmission line. The low voltage circuit further may include means in circuit with the meter to correct for the power factor of the meter, and may also additionally include a load resistance adapted to be selectively connected in the circuit to constitute a burden on the transmission line equivalent to the power supply burden at times when the power supply is disconnected to thus maintain the correct meter calibration during such time interval.

Figure 1:
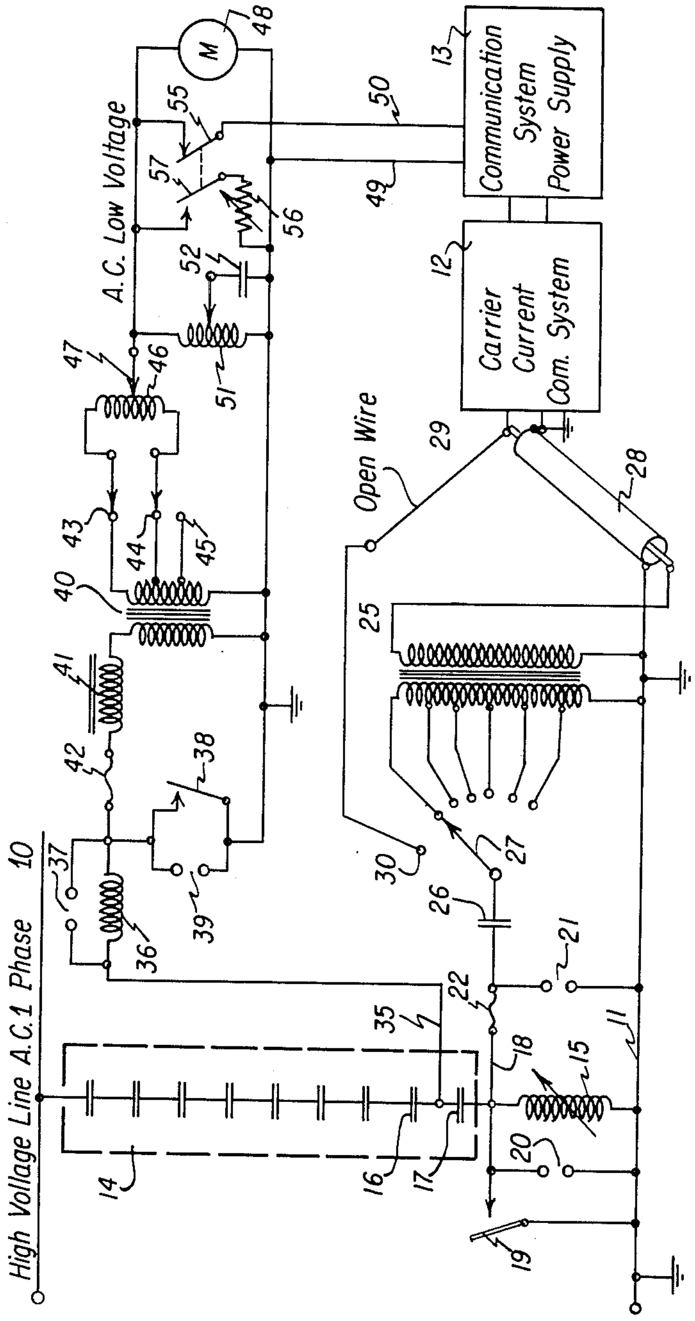
Fig. 1 is a combined schematic diagram of one embodiment of the invention.

Referring to Fig. 1 of the drawings, a high voltage alternating current 60 cycle power transmission line of the single phase type is shown, including lines 10 and 11 with the line 11 being grounded. The lines 10 and 11 may in some cases represent a single phase of a multiphase transmission system. A carrier current communication system which may include a receiver and transmitter is shown in block outline at 12 and a power supply for the communication system is shown by block outline 13. The power supply 13 may be of a standard type operating from 110 volt, 60 cycle A. C. for supplying direct current plate voltages and alternating current filament voltages to the communication system. The signal circuits, i. e., the antenna circuits of the transmitter and receiver of the communication network 12 are adapted to be connected to the high voltage line 10 and for that purpose a high pass coupling network having a cut off above the power line frequency and below the lowest frequency of operation of the communication receiver equipment 12 is provided.

The high pass coupling network comprises a capacitor stack 14 and an adjustable inductance 15 connected in series between the high voltage line 10 and ground 11, and the capacitor 26. The capacitor stack 14 includes a plurality of series connected capacitors such as those shown at 16 and 17 which are arranged as a capactive voltage divider between the high voltage of the line 10 and ground. The capacitors of the capacitor stack 14 may be enclosed in an insulating structure and immersed in insulating oil in any suitable manner (not shown). The variable inductance 15 may be adjusted to provide the optimum characteristics for a particular installation so that signals of the lowest frequency to be transmitted and received will appear across terminals 18 and 11 while the lower power line voltage frequency of about 60 cycles will be connected to ground line 11. A grounding switch 19 is provided to short circuit the inductance to ground and connect the low potential end of the capacitor stack to ground when adjustments are to be made to the equipment. A high voltage spark gap 20 and a low voltage spark gap 21 are provided to protect the equipment from excessive voltage conditions. The low voltage gap 21 is connected in parallel with the variable inductance 15 by a circuit including the fuse 22 which is of a size to fuse and open to protect the low voltage circuit if a current passes across the low voltage spark gap 21.

The signal circuits of the communication system 12 are connected to the inductance 15 of the coupling circuit through an impedance matching transformer 25 and coupling condenser 26 forming a part of the high pass filter. The multi-step switch 27 enables various impedance windings of the transformer 25 to be inserted in the circuit to match the impedance of the communication signal circuits to the coupling network. In the arrangement shown in Fig. 1 the communication system may be connected either by the 50 ohm coaxial cable 28 or the direct line 29. The switch 27 must estabilsh a circuit with contact 30 when using the open wire connections 29. The remaining transformer contacts are used to provide various impedance matching values for the coaxial cable 28.

A voltage tap 35 connected between capacitors 16 and 17 is provided to obtain a proportionately lower voltage output from the high voltage transmission line 10 for purposes of operating a meter to indicate the electrical condition of the line and for energizing the communication system. The voltage tap 35 is connected through a radio frequency choke 36 across which a spark gap 37 is connected and to the grounding switch 38 across which the spark gap 39 is connected to ground. A transformer 40 is provided with its primary winding connected in series with the low frequency reactor 41 and fuse 42 to the radio frequency choke 36 to thereby energize the transformer 40 from the voltage tap 35 of the capacitor stack 14. A secondary winding of the transformer 40 is provided with a plurality of taps 43—45, two of which may be selectively connected to a variable transformer 46 of the auto-transformer type. Connected across the variable tap 47 of the auto-transformer 46 and ground is the electrical indicating meter 48 and the input terminals 49 and 50 of the communication system power supply 13.

The meter 48 and the communication system power supply each constitute a predetermined burden on the transmission line 10. To obtain accurate meter calibration for the meter 48, the auto-transformer 46 is adjusted to provide the correctly calibrated line voltage to the communication system power supply and the meter 48 in a manner to compensate for the burden of such equipment on the power lines. The meter 48 also has a predetermined power factor which must be corrected for accurate meter indications and the power factor correcting network including the auto-transformer 51 and condenser 52 is connected as shown to provide such correction for meter power factor.

In the operation of the system thus far described, it will be understood that the reactor 41 is selected to have a value to correct the phase relationship of the voltage induced in the transformer 40 to be exactly in phase with the phase of the high voltage in the transmission line 10. Such reactance is necessary to compensate for the capacitance of the capacitor 17 in the parallel circuit with the primary winding of the transformer 40. The auto-transformer 46 is adjusted to provide the desired line voltage for proper operation of the communication system power supply which also may be the proper voltage for the calibration of the meter 48. The power factor correcting transformer 51 is adjusted to correct for the power factor of the meter 48 in such circuit. The transformer 51 and condenser 52 for correcting power factor also constitute phase correcting means which provide an adjustable fine phase correction as compared to the coarse phase correction provided by the reactor 41.

It will be noted that the input line 50 of the communication power supply 13 is provided with the line switch 55 in order that the communication system may be disconnected as desired without disabling the meter indicating circuit including the meter 48. In order to preserve the calibration of the meter 48 during such times when the communication system is not energized from the transmission line a variable resistance 56 is adapted to be inserted in the circuit in the place of the communication system power supply. The resistor 56 may be adjusted to form a burden on the transmission line equivalent to the burden of the communication system power supply. The normally open switch 57 may be closed simultaneously with the opening of switch 55 to place the additional burden resistance 56 in the circuit when the power supply is removed from the circuit. Thus there is no necessity for readjusting the auto-transformer 46 to maintain the correct meter calibration for the meter 48.

Figure 2:
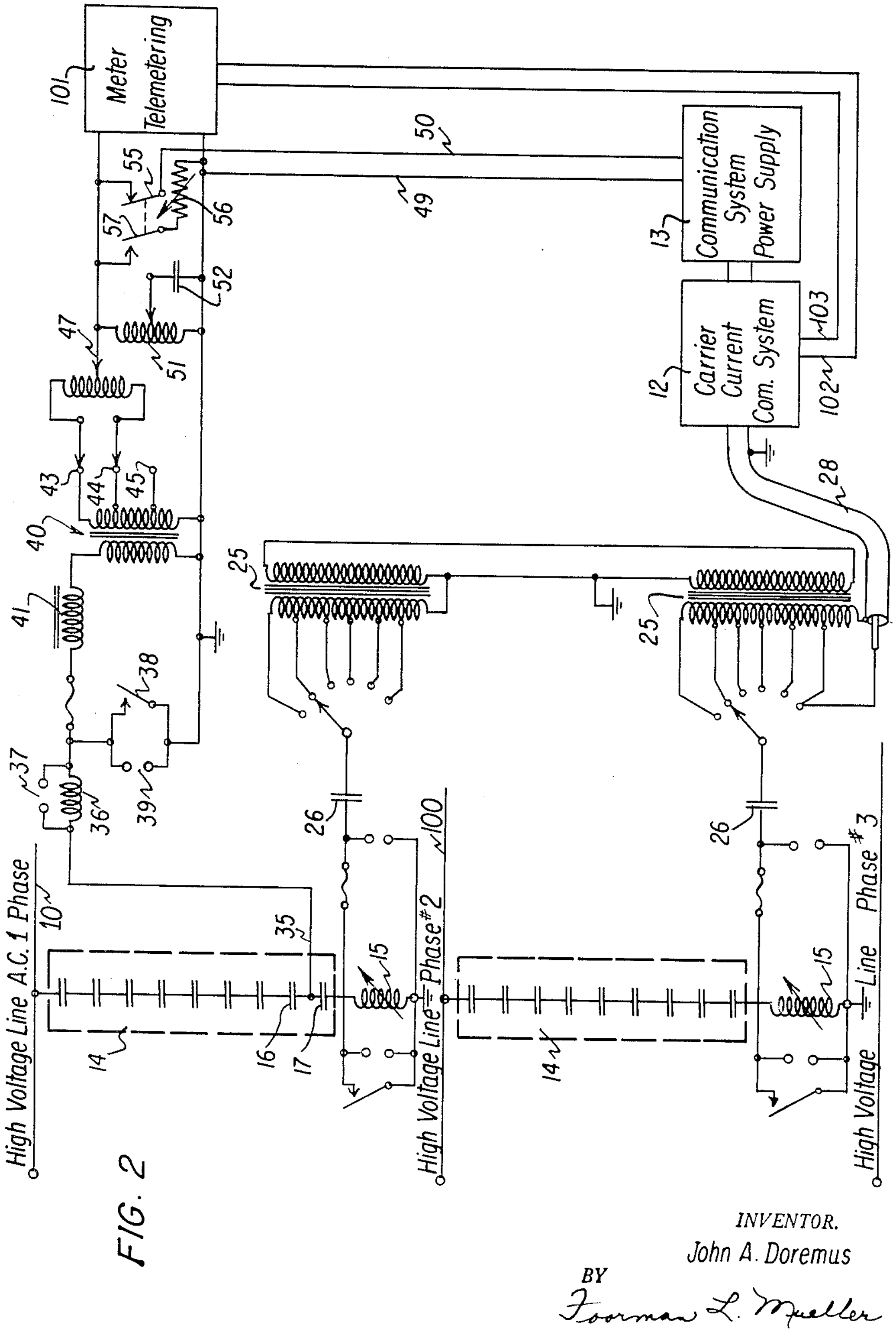
Fig. 2 is similar to Fig. 1 but showing another embodiment of the invention.

Referring to Fig. 2 of the drawings the coupling circuit of the invention is shown as applied to a three phase star connected high voltage transmission line in a manner to couple the communication system 12 by phase to phase coupling from line 10 to line 100. In such arrangement both the transmission line 10 and the transmission line 100 are provided with high pass coupling networks including the capacitor stack 14, the adjustable inductance 15, the capacitor 26, and the impedance matching transformer 25. It will be noted that the input connections to each of the impedance matching transformers 25 of the two coupling networks for the transmission line 10 and the transmission line 100 respectively differ somewhat from that of Fig. 1 and only provide for the use of a coaxial cable line 28, there being no provision for open wire connections in this arrangement.

A low voltage metering and power supply circuit is connected to the tap connection 35 between capacitors 16 and 17 of the capacitor stack 14 used in the coupling network connected to the high voltage transmission line 10 of phase one. This low voltage circuit is essentially the same as that of Fig. 1. It is to be noted that the indicating meter 101 may be of the telemetering type which provides electrical signals indicative of the electrical conditions of the high voltage line 10 to the modulation input terminals 102 and 103 of the communications system transmitter. With such arrangement the electrical condition of the high voltage line 10 may be continuously monitored so that indications of the line condition may be transmitted by the communication system 12 over the phase to phase coupling connections of the transmission lines 10 and 100. It is to be pointed out that the invention is not limited to the use of such a meter or the connections illustrated.

The telemetering type of meter 101 as shown in Fig. 2 may of course be used in the single phase carrier communication system of Fig. 1 when it is desired to continuously monitor the electrical condition of such single phase line and report the condition of the line to a remote control station. The coupling network as described provides for the metering of the transmission line by use of a low voltage metering circuit and the low voltage circuit is further arranged to provide a power source for a power supply of a carrier current communication system.

Various modifications may be made within the spirit of the invention and the scope of the appended claims.

I claim:

1. In a carrier current communication system for use with a high voltage alternating current power transmission line, a coupling network for connecting a carrier current communication system to the line including capacitor means and inductance means connected in series between said transmission line and ground, means connecting the signal channels of said communication system to said network for connection thereby to said transmission line, a power supply for said communication system, a tap connection on said capacitor means for deriving therefrom a voltage less than the voltage of the transmission line, a transformer having a primary winding connected in a circuit between said tap connection and ground, reactor means in said circuit to adjust the phase of the voltage induced in the transformer to be in phase with the voltage in said transmission line, circuit means for connecting said transformer to said power supply to thereby provide the sole power source for said power supply, and a meter connected to said transformer to indicate the electrical condition of said transmission line.

2. In a high voltage alternating current transmission line carrier current communication system, a coupling network for connecting a carrier current communication system and metering means to a transmission line, said network including a capacitor stack having a plurality of series connected capacitors and an inductance connected in series between said transmission line and ground together with a condenser connecting the signal channels of said communication system to the point of communication between said capacitor stack and said inductance, a power supply for said communication system, a tap connection between two of said series connected capacitors for deriving therefrom a voltage less than the voltage of the line, a transformer having a primary winding connected in a circuit between said tap connection and ground, reactor means in said circuit to adjust the phase of the voltage induced in the transformer to be in phase with the voltage in said transmission line, circuit means connecting said transformer to said power supply to thereby provide the sole power source for said power supply, meter means connected to said transformer, said reactor means providing phase correction so that said meter means indicates the electrical condition of said line, and telemetering means connecting said meter means to said communication system in a manner to enable transmission of signals on the transmission line representing the meter indication.

3. In a high voltage alternating current transmission line carrier current communication system, a coupling network for connecting a carrier current communication system to the line comprising in combination, a high pass filter including a capacitor stack having a plurality of series connected capacitors and an inductance connected in series between said transmission line and ground together with a capacitor connecting the signal channels of said communication system to the point of connection between said capacitor stack and said inductance, said filter being tuned to the minimum frequency of operation of said communication system, a power supply for said communication system, a tap connection between two of said series connected capacitors for deriving therefrom a voltage less than the voltage on the transmission line, a transformer having a primary winding connected in a circuit between said tap connection and ground, reactor means in said circuit to adjust the phase of the voltage induced in the transformer to be in phase with the voltage in said transmission line, circuit means including a first switch for connecting said transformer to said power supply to thereby provide the sole power source for said power supply, a meter connected to said transformer to indicate the electrical condition of said line, power factor correction means connected in circuit with said meter, said power supply and said meter having a predetermined burden for said transformer, a resistance having a value for causing a burden on the transformer equivalent to the power supply burden when connected to the transformer, second switch means to connect the resistance to said transformer, and means to operate said first and second switch means simultaneously in a manner to connect said resistance to said transformer and disconnect said power supply from said transformer.

4. In a high voltage alternating current transmission line carrier current communication system, a coupling network for connecting a carrier current communication system including a transmitter and receiver to the line and comprising a capacitor stack having a plurality of series connected capacitors for deriving therefrom a voltage less than the voltage on the transmission line and an inductance connected in series between said transmission line and ground, means connecting the signal channels of said communication system to said network for connection thereby to said transmission line, a power supply for said communication system, a tap connection between two of said series connected capacitors, a transformer having a primary winding connected in a circuit between said tap connection and ground, circuit means for connecting said transformer to said power supply to thereby provide the sole power source for said power supply, a meter connected to said transformer to indicate the electrical condition of said line, and telemetering means connecting said meter with the transmitter of said communication system in a manner to enable transmission of signals on the transmission line to be indicative of the meter indication.

5. In a high voltage alternating current transmission line carrier current communication system, a coupling network for connecting a carrier current communication system including a transmitter and receiver to the line and comprising a capacitor stack having a plurality of series connected capacitors and an inductance connected in series between said transmission line and ground, means connecting the signal channels of said communication system to said network for connection thereby to said transmission line, a power supply for said communication system, a tap connection between two of said series connected capacitors for deriving a voltage therefrom less than that of the transmission line, a transformer having a primary winding connected in a circuit between said tap connection and ground, reactor means in said circuit to provide coarse adjustment of the phase of the voltage induced in the transformer so that said voltage is in phase with the voltage in said transmission line, circuit means including a first switch for connecting said transformer to said power supply to thereby provide the sole power source for said power supply, a meter connected to said transformer to indicate the electrical condition of said transmission line, power factor correction means connected in circuit with said meter to provide fine adjustment of the phase of the voltage applied thereto, said power supply and said meter having a predetermined power burden for said transformer, a resistance having a value when connected to said transformer for causing a burden on the transformer equivalent to the power supply burden, second switch means to connect the resistance to said transformer, means to operate said first and second switch means simultaneously for connecting said resistance to said transformer and disconnecting said power supply from said transformer, and telemetering means connecting said meter to the transmitter of said communication system in a manner to enable transmission of signals on the transmission line representing the meter indication.

6. A coupling system for connection to a high voltage alternating current transmission line including in combination, a plurality of series connected capacitors, inductance means, a circuit connecting said capacitors and said inductance means in series with said capacitors connected to the transmission line and said inductance means connected to ground, communicating means connected to said inductance means for applying signals to the transmission line, a tap connection between two of said series connected capacitors, a transformer having primary and secondary windings, first reactor means, a primary circuit including said primary winding and said reactor means connected across at least one of said capacitors and said inductance means between said tap connection and ground, with said first reactor means adjusting the phase of the current in said primary winding, meter means, a secondary circuit connecting said meter means to said secondary winding of said transformer, said secondary circuit including second reactor means for controlling the phase of the current therein, with said first reactor means providing a relatively coarse phase correction and said second reactor means providing a relatively fine phase correction so that the phase of the voltage at said meter is the same as the phase of the voltage in said transmission line, and means for applying indications from said meter means to said communicating means for transmission thereby over the transmission line.

7. In a carrier current communication system for use with a high voltage alternating current power transmission line, the combination including a carrier current transmitter, a coupling network including a capacitor stack having a plurality of series connected capacitors connected to the line, a coupling inductance connected in series with said capacitors and to ground, means for connecting said carrier current transmitter to the junction between said coupling capacitors and said coupling inductance for applying signals therefrom to the line, a tap connection between two of said series connected capacitors, meter means, circuit means connecting said meter means to said tap connection for metering the characteristics of the power transmission line, said circuit means including phase correcting means for providing a voltage at said meter means having the same phase as the voltage of the transmission line, and means for applying indications from said meter means to said carrier current transmitter for transmission thereby over the line.

8. A coupling system for connection to a high voltage alternating current transmission line including in combination, a capacitor stack having a plurality of series connected capacitors connected to the transmission line, an inductance connecting said capacitors to ground, a tap connection between two of said series connected capacitors, said capacitor stack and said inductance causing a shift in phase of the voltage at said tap connection with respect to the voltage at the transmission line, a step down transformer, inductive reactor means, voltage adjusting means, output terminal means, a coupling circuit connecting said reactor means, said transformer and said voltage adjusting means from said tap connection to said output terminal means to provide a voltage across said output terminal means, said inductive reactor means having the value required to adjust the phase of the voltage at said output terminal means to be substantially in phase with the voltage at said transmission line when there is no load at said output terminal means, and an output circuit including meter means connected to said output terminal means, said coupling circuit including a power factor correcting portion connected to said output terminal means, said power factor correcting portion including adjustable means providing variation of the capacitive effect thereof for correcting for the power factor of said output circuit, so that said meter means accurately indicates the voltage and phase of the current in said transmission line.

9. A coupling system for connection to a high voltage alternating current transmission line including in combination, a capacitor stack having a plurality of series connected capacitors connected to the transmission line, inductance means connecting said capacitors to ground, a tap connection between two of said series connected capacitors for deriving therefrom a voltage substantially less than the voltage of the transmission line, said capacitor stack and said inductance means causing a shift in phase of the voltage at said tap connection with respect to the voltage at the transmission line, a transformer having primary and secondary windings, a primary circuit including said primary winding connected between said tap connection and ground, meter means, load means, impedance means having substantially the same impedance as said load means, a secondary circuit connecting said meter means to said secondary winding of said transformer and including switch means for selectively and alternately connecting said load means and said impedance means in said secondary circuit, and inductive reactor means connected in one of said circuits and having the value required to adjust the phase of the voltage across said meter means to be substantially in phase with the voltage in said transmission line in the absence of a load on said secondary circuit, said secondary circuit including adjustable power factor correction means for correcting for the power factor of said load means and said meter means so that said meter means correctly indicates the electrical condition of the transmission line, with said load means and said impedance means causing substantially the same burden on said transformer so that said power factor corrections means provides proper correction in said alternate connections.

10. In a carrier current communication system for use with a high voltage alternating current power transmission line, the combination including a carrier current transmitter, a coupling network including a capacitor stack having a plurality of series connected capacitors connected to the line, a coupling inductance connected in series with said capacitors and to ground, means for connecting said carrier current transmitter to the junction between said coupling capacitors and said coupling inductance for applying signals therefrom to the line, a tap connection between two of said series connected capacitors for deriving therefrom a voltage substantially less than the voltage of the transmission line, a transformer having primary and secondary windings, a primary circuit including said primary winding connected between said tap connection and ground, a secondary circuit including an output portion connected to said secondary winding of said transformer, inductive reactor means connected in one of said circuits and having the value required to adjust the phase of the voltage of said output portion to be substantially in phase with the voltage in said transmission line, a load circuit including meter means connected to said output portion, said secondary circuit including adjustable power factor correction means for correcting for the power factor of said load circuit so that said meter means correctly indicates the electrical condition of the transmission line, and means for applying indications from said meter means to said carrier current transmitter for transmission thereby over the line.

References Cited in the file of this patent

UNITED STATES PATENTS

| | | |
|---|---|---|
| 1,795,176 | Lloyd | Mar. 3, 1931 |
| 1,834,771 | Eastman | Dec. 1, 1931 |
| 1,924,303 | Boddie | Aug. 29, 1933 |
| 1,942,193 | Szilas | Jan. 2, 1933 |
| 2,173,487 | Seright | Sept. 19, 1939 |
| 2,192,061 | Woodworth | Feb. 27, 1940 |
| 2,217,480 | Harder | Oct. 8, 1940 |
| 2,336,258 | Kenefake | Dec. 7, 1943 |
| 2,393,021 | Cheek | Jan. 15, 1946 |
| 2,587,213 | Polin | Feb. 26, 1952 |
| 2,593,280 | Elliot | Apr. 15, 1952 |
| 2,598,432 | Price | May 27, 1952 |
| 2,627,598 | Browder | Feb. 3, 1953 |